INVENTORS
TOMIYUKI TANAKA
SHUYA ABE
BY Louis Bernat
ATTORNEY

Nov. 24, 1970 TOMIYUKI TANAKA ET AL 3,542,949

ELECTRONIC EDITING DEVICE FOR A MAGNETIC RECORDING AND REPRODUCING APPARATUS

Filed Oct. 7, 1968 5 Sheets-Sheet 2

INVENTORS
TOMIYUKI TANAKA
SHUYA ABE

BY Louis Bernat
ATTORNEY

Nov. 24, 1970 TOMIYUKI TANAKA ET AL 3,542,949

ELECTRONIC EDITING DEVICE FOR A MAGNETIC RECORDING AND REPRODUCING APPARATUS

Filed Oct. 7, 1968 5 Sheets-Sheet 3

INVENTORS

TOMIYUKI TANAKA

SHUYA ABE

BY Louis Bernat ATTORNEY

INVENTORS
TOMIYUKI TANAKA
SHUYA ABE

BY Louis Bernat ATTORNEY

Nov. 24, 1970 TOMIYUKI TANAKA ET AL 3,542,949

ELECTRONIC EDITING DEVICE FOR A MAGNETIC RECORDING AND REPRODUCING APPARATUS

Filed Oct. 7, 1968 5 Sheets-Sheet 5

INVENTORS
TOMIYUKI TANAKA
SHUYA ABE

BY Louis Bernat
ATTORNEY

United States Patent Office 3,542,949

Patented Nov. 24, 1970

3,542,949

ELECTRONIC EDITING DEVICE FOR A MAGNETIC RECORDING AND REPRODUCING APPARATUS

Tomiyuki Tanaka and Shuya Abe, Tokyo, Japan, assignors to Victor Company of Japan, Limited, Yokohama, Japan Filed Oct. 7, 1968, Ser. No. 765,381
Claims priority, application Japan, Oct. 7, 1967, 42/64,533
Int. Cl. H04n *1/36;* G11b *15/28, 27/10*
U.S. Cl. 178—6.6 7 Claims

ABSTRACT OF THE DISCLOSURE

An electronic editing device for a magnetic recording and reproducing apparatus is disclosed which is provided with rotary magnetic heads for erasing a recorded signal and rotary magnetic heads for recording and reproducing a signal disposed spaced apart a given distance from each other for editing a new signal onto a pre-recorded tape. The device comprises a time constant circuit of large value which is inserted in a holding circuit of a capstan-servo system as soon as electronic editing is started. When the recorded signal is reproduced, the time constant circuit is put out of operation so that electronic editing may not adversely affect the capstan-servo system.

The present invention relates to electronic editing devices used with magnetic recording and reproducing apparatus, and in particular the invention is concerned with an electronic editing device whereby a high frequency signal, such as a video signal, for example, is added in the form of magnetic tracks to a magnetic tape on which another high frequency signal has already been recorded in the form of magnetic tracks in such a manner that the tracks of said one high frequency signal begin where the tracks of said another high frequency signal end, so that these two signals can be reproduced without a break in continuity.

In electronic editing of signals, such as video signals, for example, for magnetic recording and reproducing apparatus provided with two magnetic recording and reproducing heads disposed diametrically opposed to each other and mounted on the edge of a rotary disc rotating in the center of a cylindrical guide drum for recording video signals in the form of sufficiently long magnetic tracks to alternately record one video field or one video frame on a magnetic tape which is driven while obliquely engaging the peripheral edge of said guide drum through substantially one-half its circumference, it has hitherto been customary to employ a pair of magnetic erasing heads which are mounted on the edge of said rotary disc in positions spaced apart a given distance from said magnetic recording and reproducing heads for erasing a signal already recorded in the form of tracks on the tape when another signal is to be recorded on said tape by said magnetic recording and reproducing heads.

There are two systems available for electronic editing of signals: in one system a new signal is inserted in an intermediate portion of the portion of the magnetic tape on which a signal is already recorded (this system is hereinafter referred to as an insert editing system), while in the other system a new signal is added to the portion of the magnetic tape on which a signal is already recorded in such a manner that the two signals are continuous with each other (this latter system is hereinafter referred to as an assembly editing system).

In order that electronic editing may be effected satisfactorily, the following two conditions must be met:

(1) The time at which the output of a bias oscillator is applied to the rotary magnetic erasing heads and the time at which a new signal is applied to the rotary magnetic recording and reproducing heads should be fully controlled relative to each other; and (2) No phase shift should occur between a signal already recorded and a new signal to be recorded at a point where editing is to be effected.

If the condition stated in point (1) is not satisfied, the tape would contain portions in which a new signal is recorded on an old signal on the same tracks or portions in which the old signal has been erased but no new signal has been recorded. A process has already been reported for satisfying this condition. Reference will substantially be made on this process.

Unless the condition stated in point (2) is satisfied, disturbance of the signals or a sudden transient phenomenon of the capstan-servo system, such as a sudden fluctuation in the number of revolutions of the capstan for driving the magnetic tape, for example, would occur at the point on the tape where the old signal ends and the new signal starts or editing is started when the new signal and the old signal recorded on the tape in succession are reproduced, thereby adversely affecting synchronizing of the signals.

For example, in the aforementioned magnetic rcording and reproducing apparatus for recording and reproducing video signals, a system is generally employed in which the rotary magnetic heads are rotated in synchronism with a vertical synchronizing signal contained in a recorded signal in a recording period and a control signal synchronous with the rotation of the rotary magnetic heads is generated, such control signal being recorded in the vicinity of the upper edge or the lower edge of the magnetic tape. In a reproducing period, said control signal is picked up from the magnetic tape so as to control fluctuation in the number of revolution of the capstan by said control signal.

When insert editing is to be effected, editing can be carried out rather easily since a new signal has only to be recorded on the tape while continuously controlling the rotation of the capstan by using the control signal already recorded.

In assembly editing, however, a new control signal must also be recorded when a new signal is recorded because the new signal is recorded in succession to the old signal on the unrecorded portion of the magnetic tape. Moreover, the distance between the new control signals in the vicinity of the editing point must be equal to the distance between the old control signals. If these distances are not equal to each other, a sudden change would occur in the number of revolutions of the capstan when said edited portion of the tape is reproduced, resulting in degradation of the effects of the visual image.

The present practice to prevent the degradation involves passing through a phase shifter a signal synchronous with a vertical synchronizing signal contained in a signal to be newly recorded prior to effecting editing to provide a phase delay signal which is compared with a signal synchronous with the rotation of the capstan by means of a phase comparator, so that the amount of phase shifting of the phase shifter can be controlled by the difference in phase between said two signals in such a manner that said phase delay signal and said signal synchronous with the rotation of the capstan can be made identical with each other in phase at all times. As soon as editing is started, the rotation of the capstan is controlled by said phase delay signal.

Such a system requires a device which contains a multiplicity of parts and consequently requires a highly advanced skill to adjust.

The present invention obviates the use of such a complicated device in effecting assembly editing. According to the invention, a time constant circuit of large value is inserted in a holding circuit for the capstan-servo system as soon as electronic editing is started, whereby the phase of a signal synchronous with the rotation of the capstan controlled by the control signals recorded prior to editing and the phase of a signal differing from said synchronous signal and synchronous with a synchronizing signal contained in a signal to be newly recorded are compared with each other so as to absorb a steep step-like voltage appearing as a noutput of the phase comparator, thereby preventing a sudden change in the number of revolutions of the capstan. In this way, the rotation of the capstan is gradually controlled by the signal synchronous with the synchronizing signal obtained in the signal to be newly recorded. It will thus be evident that the capstan is maintained in the level of rotation prevailing prior to editing when editing is started, but its number of revolutions gradually undergoes a change till it is fully controlled by the signal synchronous with the synchronizing signal contained in the newly recorded signal after a given interval of time. Since no sudden change occurs in the number of revolutions of the capstan when editing is effected, the control signals synchronous with the rotation of the magnetic heads which are recorded on the control track on the magnetic tape driven by the capstan are spaced apart from one another a distance substantially equal to the distance between the control signals recorded on the tape prior to editing. It will also be evident that in reproducing these signals after editing it is possible to control the rotation of the capstan by said control signals by releasing the aforementioned time constant circuit from the holding circuit, since there is no sudden change in the spacing between the control signals recorded on the control track on the magnetic tape.

Accordingly, one object of the present invention is to provide an electronic editing device for a magnetic recording and reproducing apparatus adapted for handling high frequency signals which eliminates disturbance of signals at the point on tape at which assembly editing is started.

Another object of the invention is to provide an electronic editing device for a magnetic recording and reproducing apparatus adapted for handling high frequency signals which comprises a simple circuit for preventing a sudden change in the number of revolutions of the capstan for driving magnetic tape occurring at the point on tape at which assembly editing is started.

Still another object of the invention is to provide an electronic editing device for a magnetic recording and reproducing apparatus in which a time constant circuit of large value is inserted in a holding circuit for the capstan-servo system at the point on tape at which assembly editing of video signals is started, whereby a transient phenomenon of the capstan-servo system can be absorbed and degradation of the effects of the visual image can be prevented.

Other objects and advantages of the present invention will become apparent from consideration of the following description when taken in conjunction with the accompanying drawings, in which.

Figure 1:
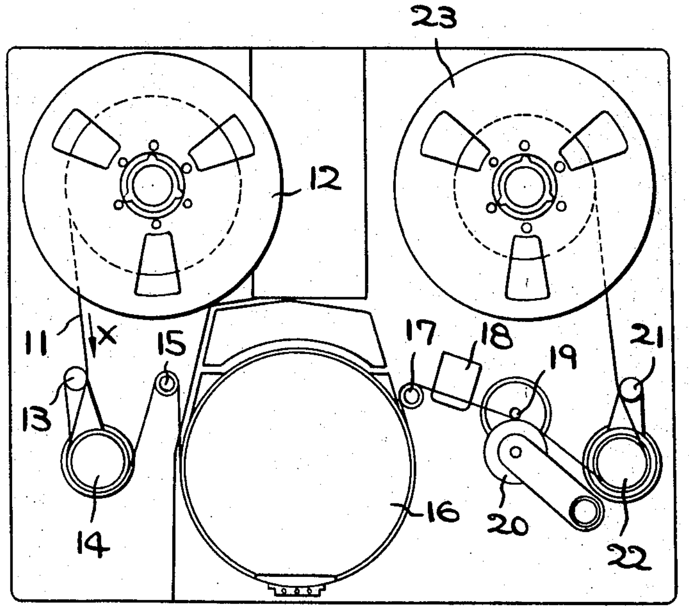
FIG. 1 is a plan view of one example of a video signal magnetic recording and reproducing apparatus provided with the device of this invention.

FIG. 1 shows a magnetic recording and reproducing apparatus embodying the device of this invention. A magnetic tape 11 unwound from a supply reel 12 is drawn through a path around a roller 14 having a tension arm 13, a guide roller 15, a guide drum 16 having rotary magnetic heads for recording and reproducing video signals as subsequently to be described, a guide roller 17, a fixed magnetic recording and reproducing head block 18 for recording audio and control signals, a capstan 19, a pinch roller 20, and a roller 22 having a tension arm to a take-up reel 23. The tape 11 is in contact with the guide drum 16 substantially one-half its circumference in such a manner that the longitudinal axis of the tape is oblique with respect to the axis of the guide drum 16.

Figure 2:
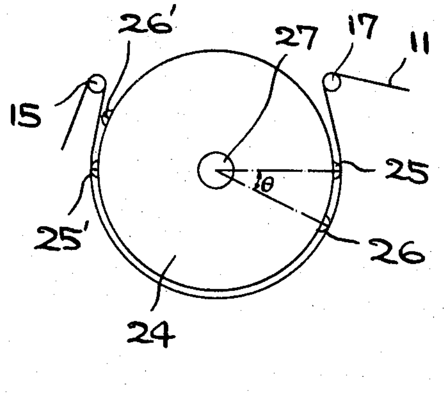
FIG. 2 is a fragmentary plan view showing the arrangement of rotary magnetic heads of the apparatus shown in FIG. 1.

The rotary magnetic heads built in the guide drum 16 shown comprise, as shown in FIG. 2, magnetic recording and reproducing heads 25 and 25' mounted in positions diametrically opposed to each other on the peripheral edge of a disc 24 rotatable in said guide drum about the center axis coaxial with the shaft of said drum in a plane vertical to said shaft of said drum, and magnetic erasing heads 26 and 26' also mounted on the peripheral edge of the disc 24 but in positions angularly displaced from the positions in which said magnetic recording and reproducing heads 25 and 25' are mounted by an angle $\theta$ with respect to the shaft 27 of the disc 24. A known head motor, not shown, for driving the disc and a known tone wheel, not shown, for generating a pulse synchronous with the rotation of the disc 24 are mounted on the shaft 27 of the disc 24.

In this embodiment, the value of said angle $\theta$ is set at about 20 degrees and said rotary magnetic heads are arranged such that as the disc 24 rotates said magnetic erasing heads 26 and 26' come into contact with the magnetic tape 11 earlier than said magnetic recording and reproducing heads 25 and 25' respectively by a time interval corresponding to said angle.

Figure 3:
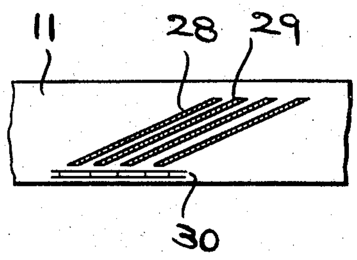
FIG. 3 is a view in explanation of magnetic tracks recorded on the magnetic tape used with the apparatus shown in FIG. 1.

Since the longitudinal axis of the magnetic tape 11 is oblique with respect to the axis of the guide drum 16, video signal tracks recorded on the magnetic tape 11 by the magnetic recording and reproducing heads 25 and 25' are in the form of oblique lines 28 and 29 with respect to the longitudinal axis of the tape 11 as shown in FIG. 3. In this embodiment, the rate of revolution of the rotary disc 24 is selected such that the oblique magnetic tracks 28 and 29 each contain information slightly larger in amount than one video field, and that the same signal is recorded on the upper end portion of the magnetic track 28 and the lower end portion of the magnetic track 29. It should be understood however that the device according to this invention can be constructed such that a video signal of one frame, instead of the video signal of one field, is recorded in each of the oblique magnetic tracks.

Recorded on one end of the magnetic tape transversely thereof and extending longitudinally thereof in the form of a control track 30 as shown in FIG. 3 are control signals which are synchronous with pulses picked up from the tone wheel, said control signals being recorded by a control signal recording and reproducing head mounted in the fixed magnetic recording and reproducing block 18.

When a new signal is to be recorded on the prerecorded magnetic tape 11 in one portion thereof, a signal to be recorded, or a video signal, for example, is frequency modulated and applied to the magnetic recording and reproducing heads 25 and 25' while passing a high frequency current for erasing to the magnetic erasing heads 26 and 26'. The signal already recorded on the magnetic tracks 28 and 29 will be erased by the magnetic erasing heads 26 and 26' and a new signal will be recorded by the magnetic recording and reproducing heads 25 and 25'.

The high frequency current passed to the magnetic erasing heads 26 and 26' must have a frequency which is sufficiently high to prevent the recording on the tape of a beat signal resulting from the interference of the waves of said current and the frequency modulated waves of a signal to be recorded in editing. It is required that the frequency of the high frequency current be over 10 MHertz. It has been found that if the recorded tracks on the tape are spaced apart from each other a distance of 60$\mu$ and the frequency of said high frequency current is set at a value of about 30 ma. *p—p*, distracting effects of the magnetic erasing heads on the adjacent tracks are substantially negligible.

When all the signals recorded on the magnetic tape 11 are to be erased, the operation is the same as with ordinary magnetic recording and reproducing apparatus; the magnetic erasing head mounted in the fixed magnetic recording and reproducing head block 18 is employed for erasing the recorded signals.

Figure 4:
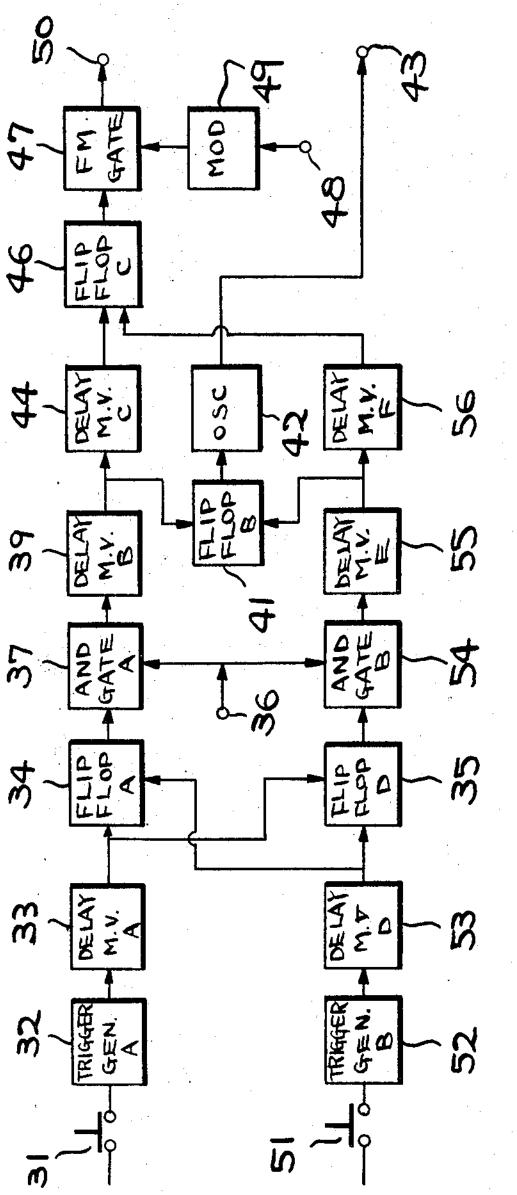
FIG. 4 is a block diagram of one embodiment of the device used in the present invention for switching recorded signals at a predetermined time interval with respect to the time at which editing is started and the time at which editing ends.

As aforementioned, the conditions stated in points (1) and (2) previously should be met if electronic editing is to be effected satisfactorily. Reports on a process for meeting the condition of point (1) are available in the literature. In order that the present invention may be clearly understood, a timing device employed in the device according to this invention will be explained briefly with reference to FIGS. 4 and 5.

Depression of a push-button switch for starting editing 31 by the operator generates an excess voltage which produces from a pulse generator 32 a trigger pulse which operates a delay multiple vibrator A33 consisting of a monostable multiple vibrator to produce as its output a pulse of the wave form shown in FIG. 5(A). Said pulse is transmitted to a flip-flop circuit A34 and a flip-flop circuit D35. The descending portion of the pulse produces in the output of the flip-flop circuit A34 a voltage shown in FIG. 5(B), while the voltage (not shown) appearing as an output of the flip-flop circuit D35 until the pulse transmitted thereto disappears after the pulse is transmitted. The output voltage of the flip-flop circuit A34 and a tone wheel pulse (shown in FIG. 5(C)) subsequently to be described which is supplied from a terminal 36 are gated at an AND gate circuit A37, and only the first pulse 38 as shown in FIG. 5(D) appears as an output of the AND gate circuit 37. Said pulse 38 triggers a delay multivibrator 39 which produces a rectangular wave 40 shown in FIG. 5(E). The descending portion of the pulse 40 produces in a flip-flop circuit B41 a voltage of the wave form shown in FIG. 5(F) which gates the output of a high frequency oscillator for erasing 42 so as to supply a high frequency current of the envelope shown in FIG. 5(G) to the rotary magnetic erasing heads through a terminal 43.

Also, the descending portion of the output voltage 40 of the delay multivibrator 39 triggers a delay multiple vibrator 44 which produces an output voltage 45 in the form of a rectangular wave as shown in FIG. 5(H). The descending portion of said rectangular wave voltage 45 triggers a flip-flop circuit C46 which produces a voltage as shown in FIG. 5(I). Said voltage gates, in an FM gate circuit 47, the output of a modulator 49 which frequency modulates the carrier wave by a signal to be newly recorded which is supplied through a terminal 48. Thus, a frequency modulated wave of the envelope shown in FIG. 5(J) is supplied to the magnetic recording and reproducing heads through an output terminal 50.

The time lag (see FIG. 5(A)) caused by the delay multivibrator A33 is determined by a time interval required for the complete build up of an oscillating voltage in an erasing high frequency oscillator 43. The time lag (see FIG. 5(E)) caused by the delay multivibrator B39 is determined by the difference between the tone wheel pulse (see FIG. 5(C)) and the vertical synchronizing signal pulse in the time of generation. The erasing high frequency current flows to the rotary magnetic erasing heads within the vertical retrace erasing period. The time lag (see FIG. 5(H)) caused by the delay multivibrator 44 is one which is equal to a time interval corresponding to the angle $\theta$ as shown in FIG. 2 which elapses after the magnetic erasing heads start erasing a pre-recorded signal and before the magnetic recording and reproducing heads start recording a new signal.

The device as described above in detail is employed for recording on the magnetic tape 11 a new signal in succession to a signal already recorded thereon.

Depression of a push-button switch for ending editing 51 when editing is finished generates a pulse from a trigger pulse generator 52 which triggers a delay multivibrator D53 similar to the delay multiple vibrator A33 to produce a rectangular wave similar to the rectangular wave shown in FIG. 5(A). The rear edge of said rectangular wave actuates the flip-flop circuit A34 whose voltage is reduced to zero. It also actuates the flip-flop circuit D35 which produces a voltage of a wave form similar to the wave form shown in FIG. 5(B). The operation similar to the operation in starting editing is repeated thereafter, and as the output voltage of the flip-flop circuit B41 is rendered zero through an AND gate circuit 54 and a delay multivibrator 55, the high frequency oscillator for erasing 42 which supplies a high frequency current to the rotary magnetic erasing heads stops oscillating. Also, the output voltage of the flip-flop circuit C46 is rendered zero through a delay multivibrator F56, so that supply of the frequency modulated wave to the magnetic recording and reproducing heads is stopped.

Figure 5:
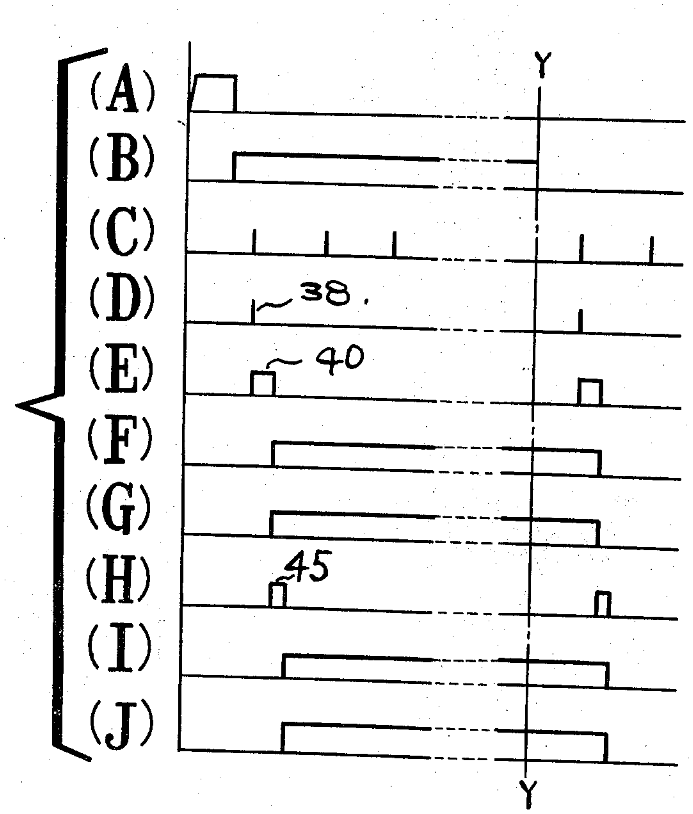
FIG. 5 is a view in explanation of wave forms at different parts of the block diagram of FIG. 4.

The horizontal axes shown in FIG. 5 are all ones representing time, and the time at which editing ends is indicated by a dotted line Y—Y.

The device embodying the present invention for meeting the condition stated in point (*a*) to permit electronic editing to be effected satisfactorily must now be described. However, before giving a detailed description of the device according to this invention, one embodiment of the prior art device that has hitherto been practiced will be explained with reference to FIG. 6 in order that the technical advantage of the present invention over the prior art may be clearly understood.

In general, magnetic recording and reproducing apparatus handling video signals or video magnetic tape recorders are provided with a known magnetic head-servo system for controlling the rotation of the rotary magnetic heads and a known capstan-servo system for controlling the rotation of a capstan for driving a magnetic tape so that rotary magnetic recording and reproducing heads may correctly trace tracks recorded on the magnetic tape when the tape is replayed. In the magnetic head-servo system shown in FIG. 6, the vertical synchronizing signal of a signal to be recorded is supplied through a terminal 61. On the other hand, the output of an oscillator 62 of 60 hertz is supplied to a rotary magnetic head drive motor 64 through a motor drive amplifier 63. A tone wheel 65 is mounted on a shaft directly connected to the rotary shaft of the motor 64. The rotation of said tone wheel produces in a pickup coil 66 a signal synchronous with the rotation of the rotary magnetic heads. Said signal and the vertical synchronizing signal of said signal to be recorded are subjected to phase comparison at a phase comparator 67. The phase of oscillation of the oscillator is varied depending on the difference in phase between said two signals, so that the rotation of the rotary magnetic heads can be controlled by the vertical synchronizing signal of the signal to be recorded at all times. In the reproducing time, a local reference vertical synchronizing signal in place of the vertical synchronizing signal of the signal to be recorded is supplied through the terminal 61, and the rotation of the rotary magnetic heads is controlled by said reference synchronizing signal.

In the recording time, a signal (not shown) synchronous with the rotation of the rotary magnetic heads which appears in the pickup coil 66 is passed through an amplifier and recorded by the fixed magnetic recording and reproducing head on the magnetic tape in the form of a control signal track.

The capstan-servo system of the prior art will now be explained. The armature of a change-over switch 68 is in contact with a terminal N in a normal magnetic recording or reproducing operation. The output of an oscillator 69 is supplied through a motor drive amplifier 70 to a capstan drive motor 71 to drive said motor 71. Mounted on a shaft directly connected to the rotor shaft of said motor 71 is a tone wheel 72, the rotation of which produces in a pickup coil 73 a signal synchronous with the rotation of the capstan which is supplied to a phase comparator 75 through a change-over switch 74 whose armature is in contact with a terminal R in a recording period On the other hand, a signal synchronous with the rotation of the rotary magnetic heads which is produced in the pickup 66 is supplied to a phase comparator 75 through the change-over switch 68 whose armature is in contact with the terminal N. The phase comparator 75 compares the phase of said two signals and supplies to the oscillator 69 a signal which varies depending on the difference in phase between said two signals. The phase of oscillation of the oscillator 69 is controlled such that it may vary depending on the value of said voltage so as to coincide at all times with the phase of a signal synchronous with the rotation of the rotary magnetic heads.

In a reproducing period, the armature of the change-over switch 74 is brought into contact with a terminal P, and a control signal reproduced by the fixed magnetic head for recording and reproducing control signals from the control signal track on the magnetic tape is supplied through the change-over switch 74 to the phase comparator 75 where the reproduced control signal and the signal synchronous with the rotation of the rotary magnetic heads are subjected to phase comparison. The phase of oscillation of the phase comparator 69 is controlled such that it coincides at all times with the phase of a signal synchronous with the rotation of the rotary magnetic heads.

When assembly editing is effected, the armature of the change-over switch 74 which is in contact with the terminal P in a reproducing mode of the capstan system is switched, at the time editing begins, into contact with the terminal R in a recording mode of the capstan system.

However, in a reproducing mode the phase of a signal synchronous with the rotation of the capstan that is produced in the pickup coil 73 and the phase of a control signal reproduced from the control signal track on the magnetic tape are not related to each other in a definite manner, so that generally the phases of these two signals do not coincide with each other. There is thus a phase difference between the two signals as the armature of the change-over switch 74 is switched from the terminal P to the terminal R when assembly editing is started. Because of this phase difference, a step-like error voltage appears as an output of the phase comparator 75 which voltage causes a fluctuation of high order to appear in the frequency of oscillation of the oscillator 69. Consequently, the rotation of the capstan motor 71 connected to the oscillator 69 undergoes a fluctuation, causing a fluctuation to occur in the speed of travel of the magnetic tape 11. This results in control signals not being recorded at regular intervals, and when this edited portion of the tape is replayed the rotation of the capstan motor 71 would become irregular and the synchronism of the reproduced signals would be disturbed, thereby degrading the effects of the visual image.

Figure 6:
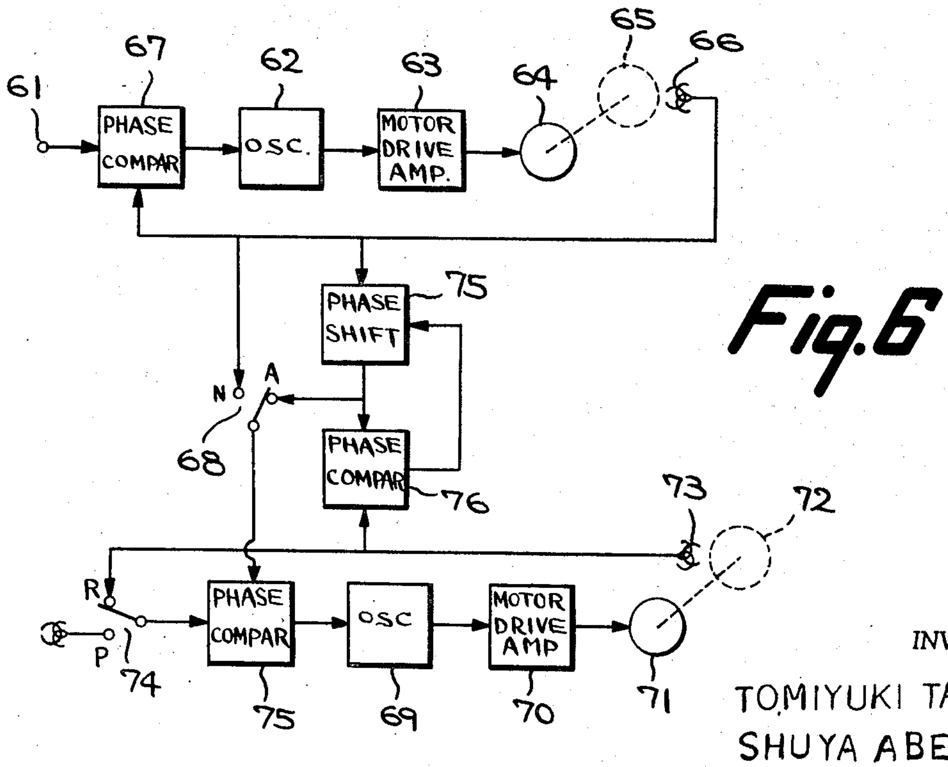
FIG. 6 is a block diagram of one embodiment of the rotary head-servo system and the capstan-servo system of the prior art.

The aforementioned defects are obviated by the process described hereunder in the prior art device shown in FIG. 6. When the capstan-servo system is in a reproducing mode before editing is started, a signal synchronous with the rotation of the rotary magnetic heads which appears in the pickup coil 66 is passed through the phase shifter 75 to have its phase delayed. The phases of this phase delay signal and a signal synchronous with the rotation of the capstan which appears in the pickup coil 73 are compared in a phase comparator 76, so that a voltage corresponding to the phase difference between the two signals is produced as an output of the phase comparator 76. The amount of phase shift in the phase shifter 75 is varied depending on this voltage, so that the two signals will coincide with each other in phase. With this preconditioning, the armature of the change-over switch 68 is brought into contact with the terminal A when assembly editing is started, and the aforementioned two signals which have been made to coincide with each other in phase are supplied to the phase comparator. Under this arrangement, no voltage would appear in the output of the phase comparator 75, so that the capstan would rotate smoothly causing no degradation of the effects of the visual image.

It will be seen from the foregoing description that the conventional device adopted for obviating the defects involved in editing a magnetic tape is complicated. The present invention obviates the defects by a device which is very simple in construction and low in cost. The device embodying the present invention will now be described with reference to FIG. 7.

In a recording period, the armatures of change-over switches 81, 82 and 99 are in contact with terminals R, while in a reproducing period they are brought into contact with terminals P. The output of an oscillator 83 of 60 hertz is amplified by a motor drive amplifier 84 to drive a rotary head motor 85. The rotation of the motor 85 results in rotation of the rotary disc 24 directly connected to the rotor shaft of said motor and also in rotation of a tone wheel 86 mounted on a shaft directly connected to the rotary shaft of said motor. A pulse voltage induced in pickup coils 87 and 88 disposed in proximity to said tone wheel and diametrically opposed to each other in position operates a flip-flop circuit 89 to produce a rectangular pulse voltage of 30 hertz. On the other hand, the output of an oscillator of 60 hertz is amplified by a motor drive amplifier 91 and drives a capstan motor 92. Rotation of the capstan motor 92 rotates the capstan 19 directly connected to the rotor shaft of said motor, so that the magnetic tape is driven in the direction of arrow Z.

The rotary magnetic head-servo system of this device will be described. In a recording period, a video signal to be recorded which is supplied through a terminal 93 has its synchronizing signal removed therefrom at a synchronizing signal separator 94. The separated synchronizing signal is transmitted to a horizontal synchronizing signal separator 95, and a horizontal synchronizing signal separated thereat synchronizes a multivibrator 96 of horizontal frequency. A pulse of horizontal frequency produced thereat is applied to an AND gate circuit 97. On the other hand, the aforementioned synchronizing signal is transmitted to a vertical synchronizing signal separator 98, and a vertical synchronizing signal separated therefrom at said separator is differentiated by a differentiation circuit and applied to the AND gate circuit 97.

In the standard television system, interlaced scanning is generally adopted, so that when the up-ramp of the vertical synchronizing signal coincides in time with the up-ramp of one of the horizontal synchronizing signals in one of two fields making up one frame the up-ramp of the vertical synchronizing signal is interposed between two adjacent horizontal synchronizing signals in the other field. Accordingly, the vertical synchronizing signal or frame pulse of every other field appears as an output of the AND gate circuit 97. A pulse of 30 hertz which is an output of a multivibrator 100 synchronized by said frame pulse and a pulse of 30 hertz supplied by the flip-flop circuit 89 are applied to a phase comparator 101 where the phases of said two pulses are compared. A DC voltage proportional to the difference in phase between these two pulses is produced as an output of said phase comparator 101 and transmitted to the oscillator 83 of 60 hertz to cause a change to appear in the frequency of oscillation. Thus, the phase of rotation of the rotary magnetic heads is controlled by the frame pulse at all times. Accordingly, the rotary magnetic recording and reproducing head 25 records a signal of a field of odd number and the rotary magnetic recording and reproducing head 25' records a signal of a field of even number on the magnetic tape 11, for example, at all times.

In a reproducing period, local standard synchronizing signals applied through a terminal 102 are transmitted through the change-over switch 81 to the horizontal synchronizing signal separator 95 and the vertical synchronizing signal separator 98. The various elements concerned in operation thereafter operate in a manner similar to the operation in a recording period so that description thereof in detail will be omitted.

In a recording period, a signal of 30 hertz synchronous with the rotation of the rotary magnetic heads which is produced at the flip-flop circuit 89 is applied to a fixed magnetic head for recording and reproducing control signals 103 through the change-over switch 99 whose armature is in contact with the terminal R, so that said signal is recorded as the control signal track 30 as shown in FIG. 3.

The capstan-servo system of the device shown in FIG. 7 will be described. In a normal recording period and a normal reproducing period, the armature of a change-over switch 104 is in contact with a terminal N which is electrically floating.

In a reproducing operation, a part of the output of the 60 hertz oscillator 90 is applied through the change-over switch 82 to a phase comparator 105 where its phase is compared with the phase of a frame pulse applied to said phase comparator by the multivibrator 100. A voltage produced as an output of said phase comparator 105 which is proportional to the difference in phase between the two signals is applied to a holding circuit 106 having a predetermined time constant, so that a holding voltage of said holding circuit is used to change the phase of oscillation of the 60 hertz oscillator 90. In this way, the phase of oscillation of the oscillator 90 is made to coincide with the phase of the frame pulse from the multivibrator at all times, so that the rotation of the capstan driven by the output of the oscillator 90 can be controlled.

In a reproducing period, a control signal of 30 hertz reproduced from the control signal track 30 on the magnetic tape by the fixed magnetic head for recording and reproducing control signals 103 is passed through the switch 99 having its armature in contact with the terminal P, amplified by a pulse amplifier 107, passed through the change-over switch 82, and applied to the phase comparator 105, where its phase is compared with the phase of a frame pulse from the multivibrator 100. Thus, the rotation of the capstan is controlled such that the phase of a reproduced control signal and the phase of a frame pulse coincide with each other.

It will be noted that a series circuit comprising a resistor 108, a capacitor 109 and a resistor 110 is connected to the output of the holding circuit 106, and that the junction of said capacitor 109 and said resistor 110 is connected by a conductor to the armature of the change-over switch 104. It will also be noted that one end of the resistor 110 and a terminal A of the change-over switch 104 are grounded. In this embodiment of the invention, the resistors 108 and 110 have values of 100 $k\Omega$ and 10 M$\Omega$ respectively and the capacitor 109 has a static capacity of 330 $\mu$F. Since the armature of the change-over switch 104 is in engagement with the electrically floating terminal N in normal recording and reproducing periods, the series circuit consisting of the resistor 108, capacitor 109 and resistor 110 may be considered to be virtually an open circuit because the resistor 110 has a value of 10 M$\Omega$, so that a voltage applied to the oscillator 90 is determined by the time constant of the holding circuit itself.

In assembly editing, the armatures of the changeover switches 81, 82 and 99 is shifted from a reproducing mode in which they are in contact with the terminals P to a recording mode in which they are brought into contact with the terminals R at the time editing starts. At the same time, the armature of the change-over switch 104 is switched from contact with the terminal N to contact with the terminal A.

In this instance, a video signal to be recorded consists of local synchronizing signals applied to the terminal 102 in a reproducing period. Accordingly, the rotary magnetic head-servo system operates smoothly without showing any transient phenomenon when shifted to a recording mode at the time editing is started. In the capstan-servo system, however, a signal compared in the phase comparator 105 with a frame pulse from the multivibrator 100 is switched from a reproduced control signal from the pulse amplifier 107 to an output signal of the oscillator 90. This results in the production of a step-like error voltage as an output of the phase comparator 105 which is applied to the holding circuit 106 for the reason set forth previously. If the series circuit consisting of the resistor 108 and the capacitor 109 were not connected to the holding circuit, the frequency of oscillation of the oscillator 90 would show a fluctuation of high order in this instance because the time constant of the holding circuit is not generally sufficiently great to absorb said step-like error voltage. This would result in a sudden fluctuation in the rate of revolution of the capstan motor 92 and hence a sudden change in the rate of travel of the magnetic tape 11, causing a great change in this instance in the spacing between control signals supplied from the flip-flop circuit 89 and recorded on the control signal track on the magnetic tape 11 by the fixed magnetic head for recording and reproducing control signals 103. Accordingly, when this edited portion of the tape is replayed, the capstan-servo system would show disturbance, resulting in degradation of the effects of the visual image.

According to the present invention, the armature of the change-over switch 104 is brought into contact with the terminal A as soon as assembly editing is started, so that the junction of the capacitor 109 and the resistor 110 is grounded, with opposite ends of the resistor 110 being short circuited. This results in a time constant circuit made up of the resistor 108 and the capacitor 109 being inserted in the holding circuit 106. The time constant of this holding circuit is greater than the time constant of the holding circuit 106 itself. The value of the time constant circuit is selected, for example, to be 33 seconds with the resistor of 100 K$\Omega$ and the capacitor of 330 $\mu$f. This time constant circuit absorbs the aforementioned step-like error voltage and aids in maintaining the frequency of oscillation of the oscillator 90 at a pre-editing level, which is to be subsequently varied gradually in accordance with the time constant of $$100\ \mathrm{K}\Omega \times 330\ \mu\mathrm{f}$$

until it is finally controlled by an output of the multiple vibrator 100. The rotation of the capstan is also controlled by this frequency of oscillation, so that an instantaneous fluctuation in the rotation of the capstan can be prevented.

When the magnetic tape 11 edited in the manner described is to be replayed, the armatures of the switches 81, 82 and 99 are switched into contact with the terminals P and the armature of the switch 104 is switched into contact with the terminal N as in a normal reproducing operation. Accordingly, the time constant circuit inserted in the holding circuit is grounded through the resistor 110 of 10 MΩ so that the circuit consisting of the resistor 108 and the capacitor 110 is considered to be virtually open. Thus, the frequency of the oscillator 90 is controlled by the time constant of the holding circuit itself. It will thus be evident that the operation of the circuit according to the present invention is similar in a reproducing period to that in a normal reproducing period. This eliminates disturbance of the capstan-servo system, enabling the system to reproduce a visual image in a stable manner. Moreover, the characterizing feature of the circuit according to this invention which distinquishes the device of this invention over the prior art device lies in the fact that the circuit is very simple in construction and low in cost.

Figure 7:
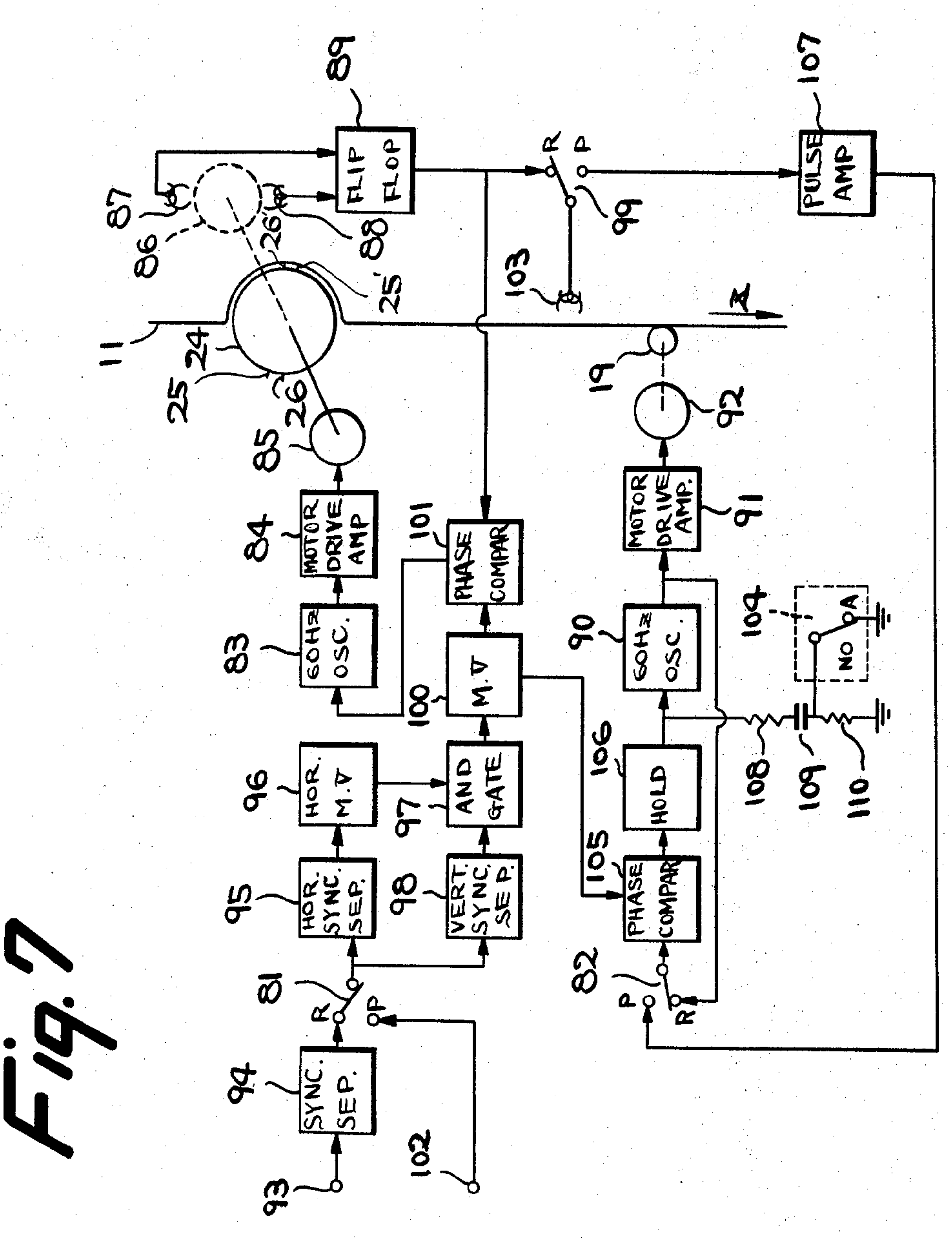
FIG. 7 is a block diagram of one example of the capstan-servo system used in the device according to this invention.
Figure 8:
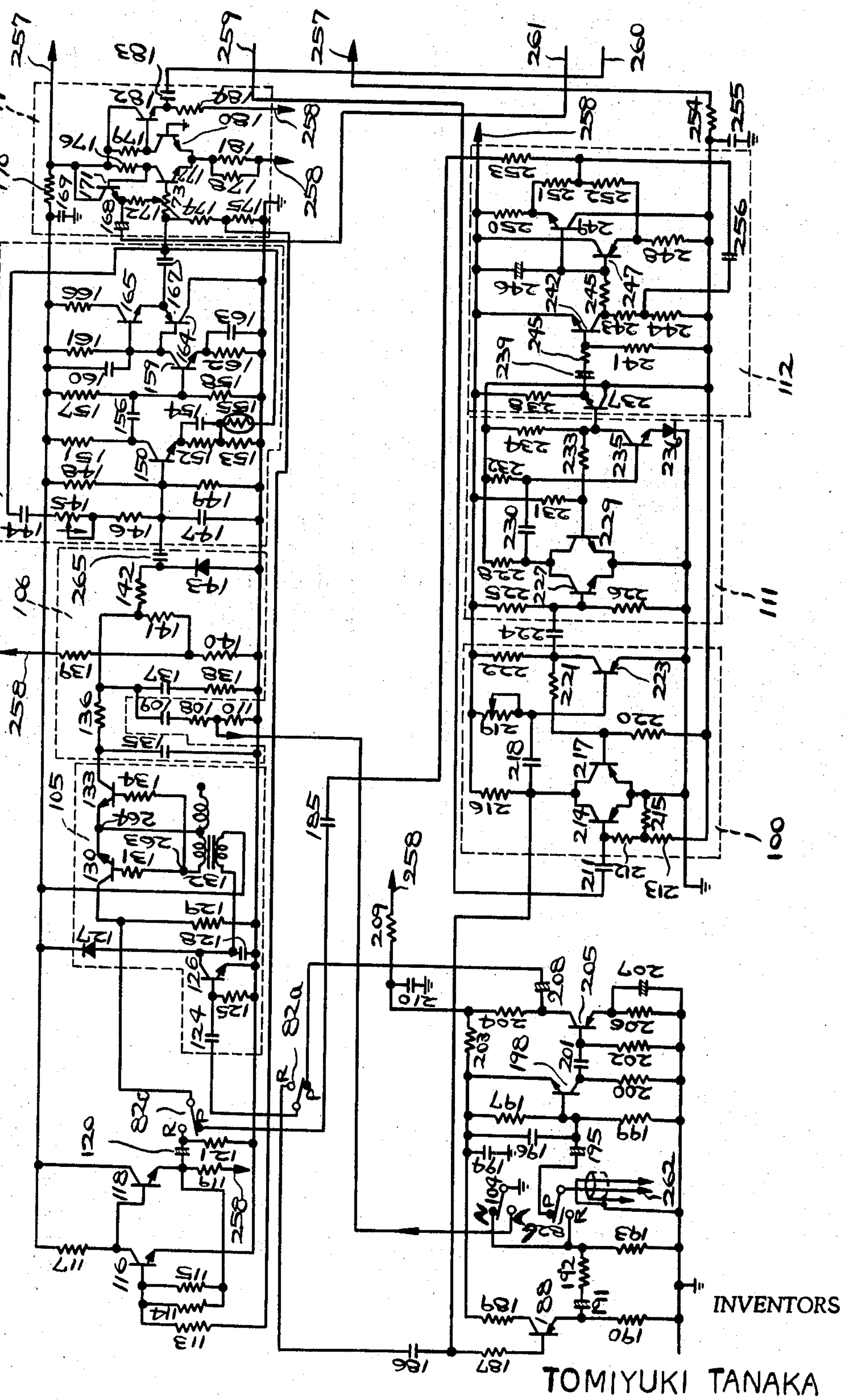
FIG. 8 is a wiring diagram of essential portions of the block diagram of FIG. 7.

FIG. 8 is a wiring diagram showing essential portions of the capstan-servo system concerned in assembly editing. Parts similar to those which appear in FIG. 7 are enclosed in boxes of dotted lines and designated by like reference characters. Shown in FIG. 8 are a trapezoidal wave generator 111 and a trapezoidal wave amplifier 112 subsequently to be described which are not shown in FIG. 7. The change-over switch 82 of FIG. 7 is divided into three switches 82*a*, 82*b* and 82*c*.

The phase comparator 105 as shown in FIG. 8 consists of a switching circuit including transistors 130 and 133, and a transformer 132 for switching said circuit. A modified with bridge circuit is used as the oscillator 90. A DC voltage of +12 volts is applied to a line 257, while a DC voltage of −12 volts is applied to a line 258.

The operation for replaying a pre-recorded magnetic tape will first be explained with reference to FIG. 8. In this operation, the armatures of switches 82*a*, 82*b* and 82*c* are in contact with the terminals P, and the armature of switch 104 is in contact with the terminal N. A frame pulse transmitted through a line 259 is passed through a capacitor 211 to trigger the monostable multivibrator circuit 100 whose output is passed through the collector of a transistor 223 and a capacitor 224 and applied to the base of a transistor 227 of the trapezoidal wave generator 111. The circuit of trapezoidal wave generator 111 consists of a monostable multivibrator substantially similar to that of the multivibrator circuit 100 except for the fact that the former includes a diode 236 inserted between the emitter of a transistor 235 and the ground. Forward resistance of said diode 236 induces a negative feedback in the circuit of the transistor 235, so that transistor of a current passed through transistors 229 and 235 takes place slowly. This results in the appearance of a trapezoidal wave in the collector of transistor 235. This voltage of trapezoidal wave form is amplified at the amplifier 112, passed through a capacitor 185 and the switch 82*c*, and applied to the collector of transistor 130 of the phase comparator 105.

The emitter of transistor 130 is connected to the emitter of transistor 133; the base of transistor 130 is connected to one end of a secondary winding of the transformer 132 through a resistor 131; and the base of transistor 133 is connected to the junction 263 of the resistor 131 and said one end of said secondary winding through a resistor 134. The other end of said secondary winding is connected to the junction 264 of the emitters of transistors 130 and 133. The collector of transistor 130 is grounded through a resistor 129, and the collector of transistor 133 is connected to a resistor 136 and a capacitor 135 of the holding circuit.

A control signal reproduced from the magnetic tape by the fixed magnetic head for recording and reproducing control signals 103 is supplied through a line 262, passed through the switch 82*b* and a capacitor 195, and applied to the base of a transistor 198. After being amplified by said transistor 198 and a transistor 205, said control signal is passed through a capacitor 208, the switch 82*a* and a capacitor 124, and applied to the base of a transistor 126 of the amplifier. Since the collector of transistor 126 is connected to the +12 volt line 257 through a primary winding of the transformer 132, a pulse current of the amplified control signal flows to said primary winding of the transformer 132, so that a pulse voltage is induced in the secondary winding of the transformer which voltage tends to make the potential of the junction 263 positive with respect to the potential of the junction 264. Accordingly, the potential of the bases of transistors 130 and 133 is higher in a positive sense than the potential of the emitters thereof during the period in which said pulse is maintained, with the result that said two transistors are fired. Thus, the voltage of trapezoidal wave form applied to the collector of transistor 130 is sampled by the pulse voltage of control signal reproduced only during said period and passed through the collector of transistor 133 so as to charge the capacitor 135. The electric charge stored in the capacitor 135 in the holding circuit 106 is transferred to a capacitor 147 through a time constant circuit consisting of the resistor 136, a capacitor 137, and a resistor 138 and a time constant circuit consisting of a resistor 142, a capacitor 265 and a capacitor 147. Since the frequency of oscillation of the oscillator 90 is determined by the potential of the capacitor 147, the frequency of oscillation of the oscillator 90 is controlled just like the center of the ramp of a trapezoidal wave is sampled by the pulse of reproduced control wave. In this embodiment, the capacitors 265 and 147 connected in series with the capacitor 137, resistor 138 and resistor 142 are each selected to have a time constant of about 0.02 second. The series circuit consisting of the capacitor 109 and resistors 108 and 110 and connected to the junction of the resistor 136 and capacitor 137 can be considered to be virtually an open circuit as aforementioned because the value of resistor 110 is as high as 10MΩ.

The mode of operation involved in assembly editing will now be described. In this operation, the armatures of switches 82*a*, 82*b* and 82*c* are in contact with the terminals R and the armature of switch 104 is in contact with the terminal A. The output voltage of oscillator 90 is passed through a variable resistor 173 of the motor drive amplifier and applied to and amplified at the base of a transistor 177 of a differential amplifier which includes another transistor 180 in addition to said transistor 177. At the same time, said output voltage is passed through the voltage dividing point of a voltage divider consisting of resistors 174 and 175 and first applied to the base of an amplifier transistor 116, then to the base of an emitter-follower transistor 118, and finally to the collector of transistor 130 of the phase comparator 105 after being passed through the emitter of transistor 118, capacitor 120 and switch 82*c*.

On the other hand, the output pulse appearing in the collector of a transistor 217 of the multivibrator circuit 100 triggered by the frame pulse supplied through the line 259 is passed through a capacitor 186, switch 82*a* and capacitor 124 and applied to the base of an amplifier transistor 126.

Accordingly, the output voltage of oscillator 90 is sampled at the phase comparator 105 by said output pulse of the multivibrator circuit 100 synchronized by the frame pulse in the same manner as in a reproducing operation, with the sampled voltage being held by the holding circuit 106. Thus, the frequency of oscillation of the oscillator 90 is controlled such that the zero point of the sine wave voltage or the output of the oscillator 90 is sampled by said output pulse at all times. The voltages whose phases are compared at the phase comparator 105 the instant all the switches are changed over from a reproducing operation to an assembly editing operation are generally different from each other in phase as aforementioned, so that a phase difference of large value appears for an instant and charges the time constant circuit of the holding circuit 106. Since opposite ends of the resistor 110 are short circuited by the switch 104 at this time, the series time constant circuit consisting of the resistor 108 and capacitor 109 is added in shunt to said time constant circuit of said holding circuit 106. Since the latter time constant circuit has a value which is as high as 33 seconds as aforementioned, the error voltage produced by the aforementioned large difference in phase is temporarily absorbed by this time constant circuit, thereby permitting the operation to be smoothly switched from playback to assembly editing. In this way, a sudden change that might otherwise occur in the frequency of oscillation of the oscillator 90 the instant the operation is switched from playback to assembly editing can be prevented, and the rotation of the capstan is shifted slowly and smoothly to a new state of equilibrium, with no degradation of the reproduced television images.

The circuit constants of the circuits shown in FIG. 8 are as follows:

| | | Static capacity or resistance value |
|---|---|---|
| Resistors: | | |
| **113** | KΩ | 100 |
| **114** | KΩ | 330 |
| **115** | KΩ | 120 |
| **117** | | 2200Ω |
| **119** | | 3300Ω |
| Capacitor: | | |
| **120** | μf | 50 |
| Resistor: | | |
| **121** | KΩ | 22 |
| Capacitor: | | |
| **124** | μf | 0.05 |
| Resistor: | | |
| **125** | KΩ | 10 |
| Capacitor: | | |
| **128** | μf | 0.01 |
| Resistors: | | |
| **129** | | 3300Ω |
| **131** | | 330Ω |
| **134** | | 330Ω |
| Capacitor: | | |
| **135** | μf | 2 |
| Resistor: | | |
| **136** | KΩ | 100 |
| Capacitor: | | |
| **137** | μf | 2 |
| Resistors: | | |
| **138** | KΩ | 10 |
| **139** | KΩ | 33 |
| **140** | KΩ | 10 |
| **141** | KΩ | 470 |
| **142** | KΩ | 100 |
| Capacitor: | | |
| **144** | μf | 0.17 |
| Variable resistor: | | |
| **145** | | 2000Ω |
| Resistor: | | |
| **146** | KΩ | 15 |
| Capacitor: | | |
| **147** | μf | 0.02 |
| Resistors: | | |
| **148** | KΩ | 120 |
| **149** | KΩ | 15 |
| **151** | KΩ | 10 |
| **152** | | 1000Ω |
| **153** | | 220Ω |
| Capacitors: | | |
| **154** | μf | 50 |
| **156** | μf | 50 |
| Resistors: | | |
| **157** | KΩ | 100 |
| **158** | KΩ | 18 |
| Capacitor: | | |
| **160** | μf | 0.01 |
| Resistors: | | |
| **161** | | 4700Ω |
| **162** | | 1000Ω |
| Capacitor: | | |
| **163** | μf | 100 |
| Resistor: | | |
| **166** | | 22Ω |
| Capacitors: | | |
| **167** | μf | 100 |
| **168** | μf | 2 |
| **169** | μf | 500 |
| Resistor: | | |
| **170** | | 51Ω |
| **172** | | 2200Ω |
| Variable resistor: | | |
| **173** | | 4700Ω |
| Resistors: | | |
| **174** | | 3300Ω |
| **175** | KΩ | 22 |
| **176** | | 4700Ω |
| **178** | | 2200Ω |
| **179** | | 4700Ω |
| **181** | | 2200Ω |
| Capacitor: | | |
| **183** | μf | 200 |
| Resistors: | | |
| **184** | | 2200Ω |
| Capacitors: | | |
| **185** | μf | 50 |
| **186** | μf | 0.005 |
| Resistors: | | |
| **187** | | 1000Ω |
| **189** | | 100Ω |
| **190** | | 1000Ω |
| Capacitor: | | |
| **191** | μf | 50 |
| Resistors: | | |
| **192** | | 100Ω |
| **193** | KΩ | 10 |
| Capacitors: | | |
| **194** | μf | 50 |
| **195** | μf | 1 |
| **196** | μf | 0.001 |
| Resistors: | | |
| **197** | KΩ | 10 |
| **199** | KΩ | 150 |
| **200** | KΩ | 10 |
| Capacitor: | | |
| **201** | μf | 3 |
| Resistors: | | |
| **202** | KΩ | 10 |
| **203** | | 2200Ω |
| **204** | KΩ | 10 |
| **206** | | 1000Ω |
| Capacitors: | | |
| **207** | μf | 10 |
| **208** | μf | 3 |
| Resistor: | | |
| **209** | | 1000Ω |
| Capacitors: | | |
| **210** | μf | 100 |
| **211** | pf | 470 |
| Resistors: | | |
| **212** | | 5600Ω |
| **213** | | 5600Ω |
| **215** | | 560Ω |
| **216** | | 2200Ω |
| Capacitor: | | |
| **218** | μf | 2 |
| Variable resistor: | | |
| **219** | KΩ | 10 |

| | | |
|---|---|---|
| Resistors: | | |
| 220 | KΩ | 56 |
| 221 | KΩ | 10 |
| 222 | | 2200Ω |
| Capacitor: | | |
| 224 | pf | 500 |
| Resistors: | | |
| 225 | KΩ | 47 |
| 226 | KΩ | 10 |
| 228 | KΩ | 2.2 |
| Capacitor: | | |
| 230 | μf | 1 |
| Resistors: | | |
| 231 | KΩ | 56 |
| 232 | KΩ | 12 |
| 233 | | 4700Ω |
| 234 | | 2200Ω |
| 238 | | 4700Ω |
| Capacitor: | | |
| 239 | μf | 22 |
| Resistors: | | |
| 240 | | 470Ω |
| 241 | KΩ | 22 |
| 243 | | 3900Ω |
| 244 | | 2700Ω |
| 245 | | 51Ω |
| Capacitor: | | |
| 246 | μf | 2 |
| Resistors: | | |
| 248 | | 2200Ω |
| 250 | | 2200Ω |
| 251 | | 51Ω |
| 252 | | 51Ω |
| 253 | KΩ | 10 |
| 254 | | 51Ω |
| Capacitors: | | |
| 255 | μf | 500 |
| 256 | μf | 100 |
| 265 | μf | 0.02 |

In assembly editing, an output pulse appearing in the collector of transistor 217 of the multivibrator circuit 100 shown in FIG. 8 is passed through a resistor 187 and applied to the base of an amplifier transistor 188, and a pulse voltage appearing in the emitter of said transistor 188 is passed through a capacitor 191, resistor 192 and switch **82*b*, transmitted to the line 262, and recorded by the fixed magnetic head for recording and reproducing control signals 103 as a control signal on the magnetic tape 11**.

Figure 9:
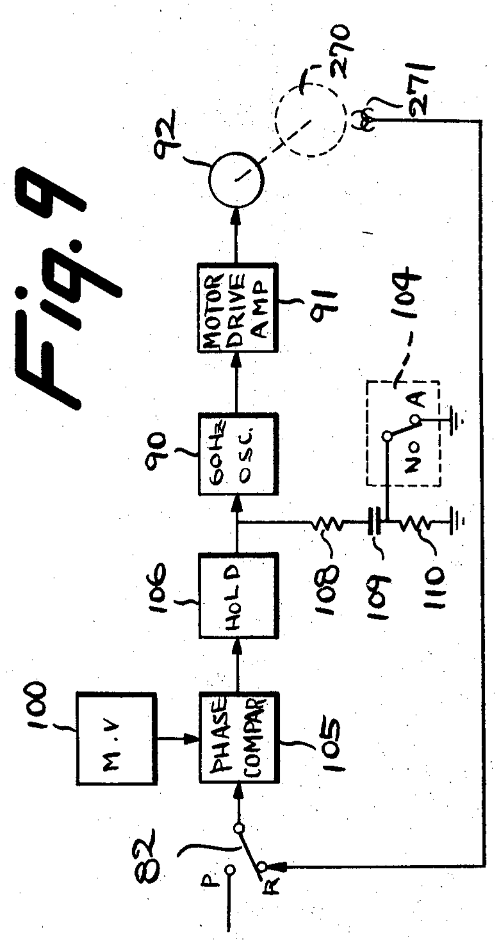
FIG. 9 is a block diagram of another embodiment of the capstan-servo system used in the device according to this invention.

Shown in FIG. 9 is a block diagram of another embodiment of the capstan-servo system used in the device according to this invention, in which similar circuits as shown in FIG. 7 are designated by like reference numerals. In this embodiment, a tone wheel 270 is mounted on a shaft directly connected to the rotor shaft of the capstan motor 92. In assembly editing, a signal synchronous with the rotation of the capstan 19 which is induced in a pickup coil fixedly mounted in the vicinity of said tone wheel 270 is applied to the phase comparator through the change-over switch 82, where the phase of said signal is compared with the phase of a signal synchronous with the frame pulse from the multivibrator circuit 100. In this case, the series circuit consisting of the resistor 108, capacitor 109 and resistor 110 and the change-over switch 104 operate in the same manner as in the embodiment shown in FIG. 7. It will thus be evident that editing can be effected satisfactorily in the embodiment shown in FIG. 9.

It is to be understood that the present invention is not limited to the particular forms of the embodiments described, but that many changes and modifications may be made therein without departing from the spirit and scope of the invention.

What we claim is:

1. An electronic editing device for a video magnetic tape recorder comprising means for moving a magnetic tape through said recorder responsive to a servo system, means including a plurality of magnetic heads mounted to travel relative to said tape motion, means including said heads for erasing a portion of said tape and recording an editing signal in lieu thereof, means including a timing circuit for measuring a long period of time for holding said servo system inactive responsive to a command to edit signal, and means responsive to an end of editing signal for ending the control of said timing circuit over said servo system.

2. An editing device for a video signal magnetic tape recorder, said video signal including periodically recurring synch pulses, said device comprising means including a rotating disk carrying recording and erasing heads on the periphery of said disk, said heads being displaced from each other by a predetermined angular distance means including a servo system controlling a capstan for moving said tape past said heads and for generating an A.C. signal in synchronism with the rotation of said capstan, means for comparing the synch pulses with said A.C. signal, means responsive to said comparing means for changing the rotation of said capstan until said synch pulses and said A.C. signal come into phase, and means including a timing circuit for measuring a long time period for disabling said servo system until said synch pulses and said A.C. signal come into phase.

3. An electronic editing device for video signals comprising means including a plurality of magnetic recording and reproducing heads mounted on the peripheral edge of a rotary disc for recording video signals in parallel and oblique tracks on a magnetic medium, at least one field or one frame being recorded in each one of said oblique tracks, a plurality of magnetic erasing heads mounted on the peripheral edge of said rotary disc, each erase head being spaced a given distance away from an associated one of said magnetic recording and reproducing heads, a capstan and a capstan motor for moving said magnetic medium, means comprising an oscillator for genearting a wave form for driving said capstan motor, means for producing a signal which is synchronous with the rotation of said capstan, said video signals including a basic frame signal, means for comparing the phase of said basic frame signal and the phase of the synchronous signal, said comparing means producing a voltage corresponding to the difference between the phases of said two signals, means including a holding circuit having a given time constant, timing means comprising a time constant circuit for measuring a period which is longer than said given time constant, means for applying said phase difference voltage to said holding circuit for determining the oscillation phase of said oscillator, means for controllingly adjusting the oscillation phase of said oscillator until said difference in phase becomes zero, means responsive to the start of assembly editing for connecting said timing means to said holding circuit, means comprising said magnetic erasing heads for earsing the video signals recorded on said tracks on said magnetic medium responsive to the start of said assembly editing, means comprising said magnetic recording and reproducing heads for recording new video signals on said tracks after the old video signals have been erased, means for disconnecting said timing means from said holding circuit during reproduction of said new video signals, and means for rendering said erasing means inoperative.

4. The electronic editing device of claim 3 in which said timing means is a series circuit consisting of a resistor and a capacitor.

5. The electronic editing device of claim 3 in which said holding circuit has a capacitor at one side, said timing means is a series circuit consisting of a capacitor, a first resistor and a second resistor having a larger resistance value than the resistance value of said first resistor, and said means for connecting said timing means to and for disconnecting said timing means from said holding circuit comprises means for connecting an end of said series circuit to the capacitor side of said holding circuit, means for grounding an end of said series circuit on the second resistor side, a change-over switch having a grounded contact and an electrically floating contact, means for electrically connecting the armature of said change-over switch to an end of said second resistor opposite to the end which is grounded, and means for switching said armature into contact with a point between said grounded contact and said electrically floating contact.

6. The electronic editing device of claim 3 in which said synchronous signal is the oscillatory output signal of said oscillator.

7. An electronic editing device of claim 3 further comprising a tone wheel rotating with said capstan, and a fixed pickup coil mounted in the vicinity of said tone wheel, said means for producing a synchronous signal comprising a means for inducing a pulse voltage in said pickup coil responsive to the rotation of said tone wheel.

References Cited

UNITED STATES PATENTS

| | | | |
|---|---|---|---|
| 3,342,949 | 9/1967 | Wessels | 179—100.2 |
| 3,436,489 | 4/1969 | Bounsall | 178—6.6 X |

BERNARD KONICK, Primary Examiner

S. B. POKOTLLOW, Assistant Examiner

U.S. Cl. X.R.

179—100.2